United States Patent [19]

Palmer et al.

[11] 4,452,770

[45] Jun. 5, 1984

[54] PHOSPHOANHYDRITE PROCESS

[75] Inventors: Jay W. Palmer, Temple Terrace, Fla.; John C. Gaynor, Des Plaines, Ill.

[73] Assignee: United States Gypsum Company, Chicago, Ill.

[21] Appl. No.: 330,529

[22] Filed: Dec. 14, 1981

[51] Int. Cl.$^3$ .......................... C01F 1/00; C01F 5/00; C01F 11/00; C01B 25/16
[52] U.S. Cl. ...................................... 423/167; 423/2; 423/320; 423/555
[58] Field of Search ............... 423/166, 167, 320, 555, 423/2, 319

[56] References Cited

U.S. PATENT DOCUMENTS

| | | | |
|---|---|---|---|
| 1,154,231 | 9/1915 | Breolt | 423/2 |
| 2,006,342 | 7/1935 | Booge et al. | 23/122 |
| 2,531,977 | 1/1950 | Hammaren | 23/165 |
| 2,885,263 | 5/1959 | Pat | 423/167 |
| 3,003,852 | 10/1961 | Nordengren | 423/320 |
| 3,745,208 | 7/1973 | Bigot et al. | 423/166 |
| 3,792,151 | 2/1974 | Case | 423/166 |
| 3,906,083 | 9/1975 | George | 423/555 |
| 4,146,568 | 3/1979 | Lange | 423/2 |
| 4,328,193 | 5/1982 | Larson | 423/167 |

FOREIGN PATENT DOCUMENTS 0012487 6/1980 European Pat. Off. .

OTHER PUBLICATIONS

Phosphoric Acid, P. Slack Ed., vol. 1, pp. 331–362, 1968.
Translation of Sekko to Sekkai No. 75, pp. 314–317, 1965, "Some Factors Relating to the Hydration of Anhydrite.
Rapid Conversion of Anhydrite to Gypsum I & EC, vol. 49, No. 5, 1957, pp. 818–821.
Robert Conley, The Hydration Reaction on Anhydrite, 1958.
Sekko to Sekkai No. 8, 3–10, 1953, Studies on the Hydration of Natural Anhydrite.

*Primary Examiner*—O. R. Vertiz
*Assistant Examiner*—Gregory A. Heller
*Attorney, Agent, or Firm*—Robert H. Robinson; Kenneth E. Roberts; Samuel Kurlandsky

[57] ABSTRACT

A wet process for producing phosphoric acid and phosphoanhydrite by acidulation of phosphate rock with a phosphoric acid/sulfuric acid mixture containing a very high recycle content of small sized anhydrite seed crystals. A strong phosphoric acid is obtained having a concentration of at least about 35% $P_2O_5$. Further, the phosphoanhydrite may be readily converted to an industrially usable gypsum product.

11 Claims, 4 Drawing Figures

STABILITY DIAGRAM – $CaSO_4$ IN $CaSO_4 \cdot H_3PO_4 \cdot H_2O$ SYSTEM

FLOW DIAGRAM PHOSPHORIC ACID AND PURIFIED GYPSUM

PHOSPHOANHYDRITE PROCESS

BACKGROUND OF THE INVENTION

1. Field of the Invention

The present invention relates to the production of phosphoric acid and more particularly refers to an improved wet process for converting phosphate rock into a concentrated phosphoric acid with concomitant production of an improved calcium sulfate.

In conventional wet methods of producing phosphoric acid, finely divided phosphate rock is digested with a mixture of phosphoric acid, sulfuric acid and water causing a reaction between the calcium phosphate in the rock and the sulfuric acid to produce phosphoric acid and a precipitate of calcium sulfate (either the anhydrite form—$CaSO_4$ with no water of hydration; the hemihydrate form—$CaSO_4 \cdot \frac{1}{2} H_2O$; or the dihydrate form—$CaSO_4 \cdot 2H_2O$). Over the years numerous improvements and refinements in these methods have been proposed, many of which are described in *Phosphoric Acid* edited by A. V. Slack (published by Marcel Dekker, Inc., New York, 1968). Many of these refinements are directed to producing the calcium sulfate co-product in various forms.

Most wet processes are directed to producing the calcium sulfate product in the dihydrate form, or phosphogypsum. In most commercial operations, the plants are run at about 75°–80° C. and 30% $P_2O_5$ in the leach zone. Here the reaction of sulfuric acid and apatite (phosphate rock) is over in about 15 minutes. However, a residence time of about 4 hours is needed for gypsum crystal growth to sufficiently large crystals for filtration. Generally, the practical maximum $P_2O_5$ concentration of the phosphoric acid for a dihydrate process is around 29–30% (40–41% $H_3PO_4$), which must subsequently be concentrated to higher levels, while the operational temperature is about 75°–80° C. Above these temperatures and $P_2O_5$ concentration limits, the phosphogypsum becomes unstable during operations so that increased amounts of the metastable hemihydrate are formed, with attendant hardening and setting up in mixing vessels and greatly increased reaction times. Further concentration of the phosphoric acid to more concentrated products requires energy intensive and expensive evaporators. A phosphoric acid of about 42% $P_2O_5$ (60% $H_3PO_4$) is needed because fertilizer manufacturers use this concentration to make diammonium phosphate.

A less commercially attractive variant on the wet process is the hemihydrate process. The hemihydrate processes may be useful in obtaining a calcium sulfate for building materials manufacture. However, the operator must be careful that the filters do not cool since the hemihydrate can set to gypsum. Then jackhammers are needed to remove it. Further, the hemihydrate product is objectionable because impurities such as radium in the ore and excess phosphoric acid are carried over into the hemihydrate. Here again, the phosphoric acid product, about 32% $P_2O_5$, must be concentrated for fertilizer production.

According to data published in the Slack text volume 1 part 1, in an article on hemihydrate and anhydrite processes in Europe by P. M. R. Versteegh and J. T. Boontje, phosphoanhydrite can possibly be produced in a phosphoric acid attack system provided the temperature and concentration of the acids are sufficiently high, about 135° C. and about 80% $H_3PO_4$. For example, it is there proposed that anhydrite could be made at 95°–100° C. in a mixture of 42% $P_2O_5$ phosphoric acid and 3–3.5% sulfuric acid; or at 85°–90° C. in the presence of 48–52% $P_2O_5$ phosphoric acid. In the first case, a 75–82% sulfuric acid would be required; and in the second case, a 78% sulfuric acid would be required for the phosphate rock in the leach zone. The reference appears devoid of any mention of using anhydrite seed crystal in the proposed processes.

2. Description of the Prior Art

U.S. patent 2,531,977 discloses a dihydrate wet process for producing phosphoric acid with the suggestion that the phosphogypsum obtained be thereafter treated with 15–33% sulfuric acid at a temperature of from 60° C. to the boiling point of the sulfuric acid solution for periods of more than 30 minutes (generally 2–3 hours) to obtain a calcium sulfate anhydrite. Nothing is known about the purity or practical usability of this anhydrite.

SUMMARY OF THE INVENTION

There is a need at the present time to provide improved processes for reducing the energy requirements and equipment capitalization expenses in phosphoric acid production; further to provide economical means of obtaining higher $P_2O_5$ content phosphoric acid product; and further to provide processes which convert the previous "waste" calcium sulfate co-product into material acceptable for commercial utilization in gypsum board and other industrial and construction materials.

One object of the present invention is to provide a process for economically and efficiently producing increased yields of strong phosphoric acid. Strong phosphoric acid as defined herein is phosphoric acid of at least about 35% $P_2O_5$ (48% $H_3PO_4$), and preferably about 42% $P_2O_5$ (60% $H_3PO_4$), content. Another object of this invention is the production of a phosphoanhydrite which may be converted to gypsum products useful in the construction and building materials industry.

It has been discovered that there is a very narrow range of temperature and phosphoric acid and sulfuric acid concentration conditions wherein a very stable insoluble anhydrite is produced; and further, that in the presence of large amounts of recycle anhydrite seed crystals, the rate of anhydrite crystallization is very rapid. In addition, it has also been found that, in a separate reactor under certain conditions, particularly including a large proportion of dihydrate seed crystals, the phosphoanhydrite may be rapidly converted to a gypsum product suitable for use in construction and industrial materials.

The present invention comprises digesting phosphate rock with a mixture of phosphoric acid, sulfuric acid, water and recycle anhydrite seed crystals. Finely divided phosphate rock, sulfuric acid, phosphoric acid, small sized anhydrite seed crystals and water are slurried in a first mixing zone between about 60°–110° C., preferably about 75°–95° C. The quantity of sulfuric and phosphoric acids charged to the mixing zone is such as to provide in the slurry about 62–73% total phosphoric acid and sulfuric acid content, with about 1–4 weight % being sulfuric acid. The slurry will have about 20–50% total solids comprising a weight proportion ranging from about 10:1 to about 100:1 of anhydrite seed crystals to finely divided phosphate rock. Thereafter, the slurry is separated into a raffinate of about 35–45% $P_2O_5$ phosphoric acid and a recyle slurry for the attack tank. Optionally, a portion of the phosphoanhydrite is separated by series separation from the recycle slurry, and mixed with additional sulfuric acid and a sulfate hydration accelerator plus a large proportion by weight of dihydrate seed crystals to convert the phosphoanhydrite to a purified gypsum product of low radioactivity.

BRIEF DESCRIPTION OF THE DRAWINGS

FIGS. 3-5 are scanning electron microphotographs of various calcium sulfate products produced by the present invention.

DETAILED DESCRIPTION OF THE PREFERRED EMBODIMENTS

It is theorized that all phosphoric acid processes of the wet process type are carried out under conditions wherein an insoluble anhydrite is the thermodynamically stable form of calcium sulfate. The crystal states actually precipitated, however, in most commercial wet processes are the metastable varieties, the hemihydrate and dihydrate. Conversion of these into the stable anhydrite modification under the conditions prevailing in the dihydrate and hemihydrate wet processes is extremely slow. This is because the activation energy required to cross the energy barrier for conversion is very high.

Figure 1:
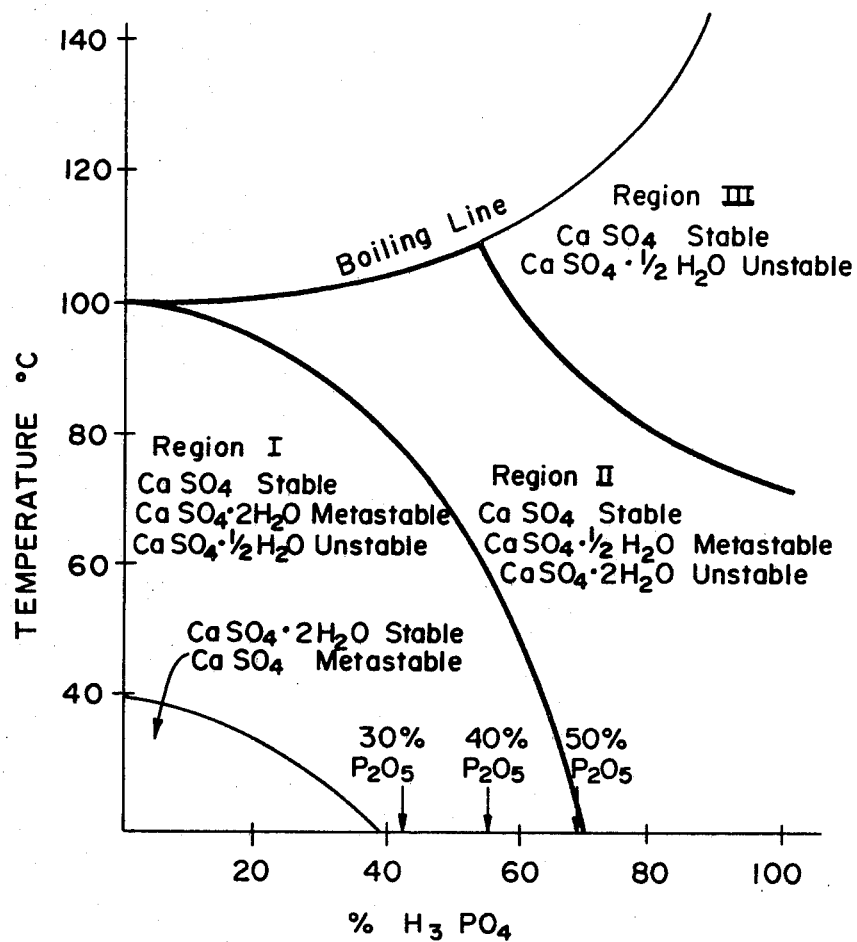
FIG. 1 is a plot of phosphoric acid concentrations, with approximately 1.5% sulfuric acid present versus temperature showing the states of hydration of the calcium sulfate and the area of interest in the present invention (Region II) in heavier lines.

Referring to FIG. 1, under practical process conditions in wet processes for producing phosphoric acid, the rate of calcium sulfate crystal growth is proportional to the supersaturation level of a high concentration of reacting calcium and sulfate ions. The solids deposited per unit of time is proportional to the available crystal surface area (or for a given crystal seed, its specific surface), a low water content (i.e., a high $P_2O_5$ phosphoric acid concentration) and high temperature. In Region I, the dissolution of finely divided phosphate rock takes place through the dissolving action of phosphoric acid, and to some degree sulfuric acid. The calcium ion that is brought into solution in this region combines with sulfate ion to precipitate the unstable hemihydrate. This hemihydrate in turn dissolves and recrystallizes as the dihydrate, particularly if dihydrate seed crystals are available for surface precipitation. This region is where most commercial processes operate. However, above the practical 28-32% $P_2O_5$ concentrations and 75°-80° C. for the dihydrate process, the calcium sulfate dihydrate becomes unstable and increasing amounts of the metastable hemihydrate are formed, especially if large amounts of hemihydrate seed crystals are present. Again, conversion of the hemihydrate to a stable insoluble anhydrite is slow. In region II along the border to region III of FIG. 1, the conditions are sufficient to precipitate anhydrite on an insoluble anhydrite seed crystal, and any hemihydrate will readily convert to anhydrite since the hemihydrate phase is unstable. The rate of precipitation is dependent upon the temperature, solution agitation, surface area of seed crystals, solids content of the mixture, sulfuric acid concentration and the time allowed for phosphate rock accidulation and anhydrite recrystallization.

The process of the present invention should be operated in the leach zone at a temperature between about 60° C. and about 110° C., preferably about 75°-95° C. Substantially below about 75° C., increased cooling capacity would be needed and sufficient hemihydrate would be formed to interfere with the process. Substantially above 95° C. is undesirable for additional heat would be needed to maintain the reaction.

Sufficient solution agitation is accomplished in conventional mixing vessels for phosphate ore or rock digestion. The process may be carried out in either multitank digesters or a single tank system with multiple zones, compartments or cells.

The preferred anhydrite seed crystals have an optimum mean particle size of about 1-10 micrometers, more preferably 1-4 micrometers. The seed crystals may be derived from any origin, but preferably are recycle product for continuous operation.

The anhydrite seed crystal recycle rate is preferably about 20:1 to 100:1, and more preferably about 60:1-80:1, by weight, of anhydrite to phosphate rock ore. At substantially less than about 20:1 in region II of FIG. 1, hemihydrate seed crystals precipitate. Above about 100:1 recycle, the time for reaction becomes excessive. Maintaining this ratio is readily accomplished by controlling the metering of ore into the mixing zone. If the ore is metered too fast then some hemihydrate formation occurs, and there is insufficient balancing of the reaction conditions to overcome the energy barrier shift from the metastable hemihydrate to the anhydrite.

The "free", excess above stoichiometric, sulfuric acid concentration in the present process ranges from about 1 to 4%, with about 1.5-2% being optimum. If substantially less than 1% free sulfuric acid is present, the accidulation rate of the ore is decreased and the phosphate ore particles tend to become encapsulated with relatively insoluble dicalcium orthophosphate. Also, increasing amounts of silicate gels are formed, which interfere with calcium sulfate crystal growth. Above about 4% free sulfuric acid, the accidulation rate of the ore is also decreased and the ore particles tend to become encapsulated with calcium sulfate coatings.

Figure 2:
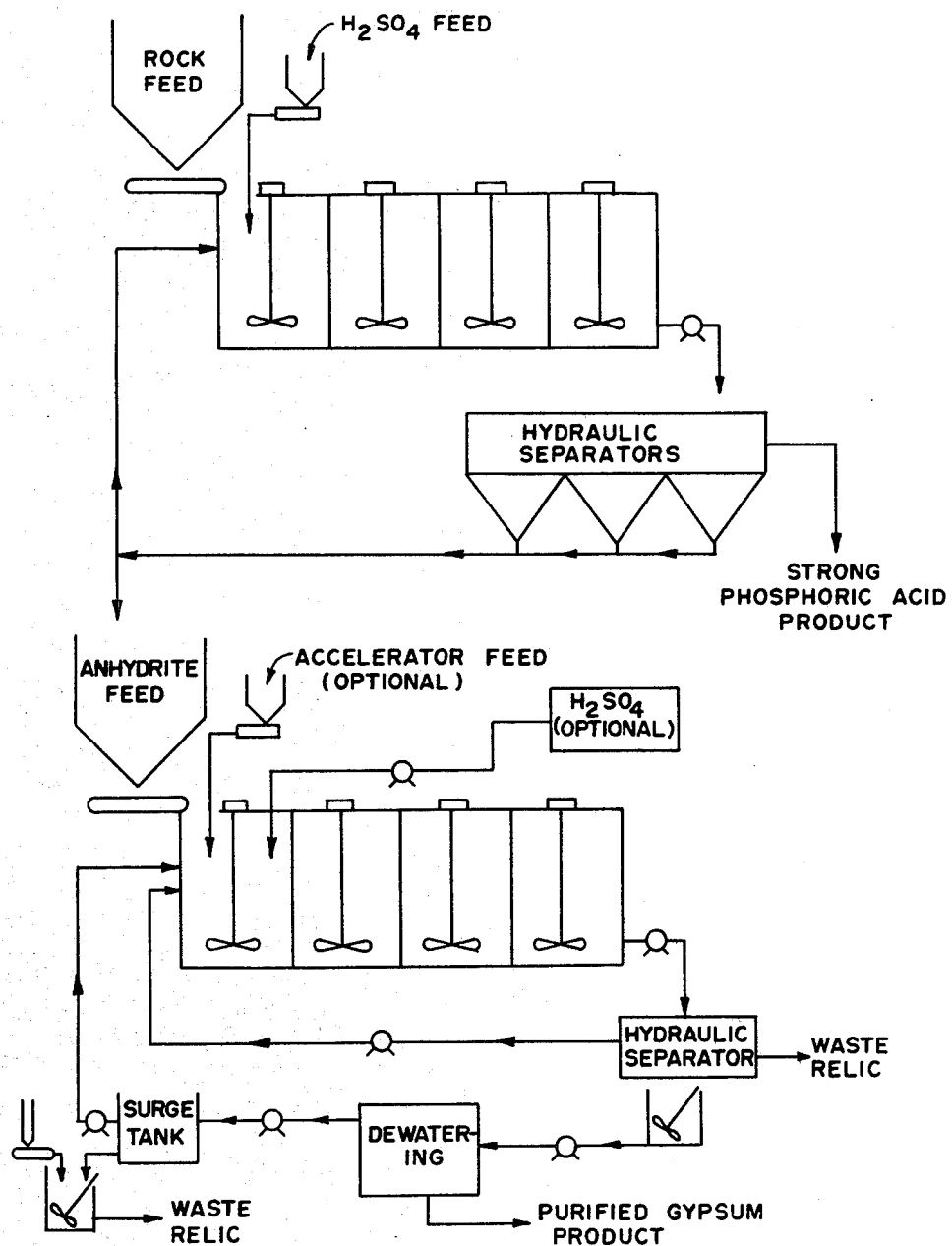
FIG. 2 is a labelled flow sheet diagrammatically illustrating the various vessels, all of which are conventional, employed in the process.

In the digesting zone, as shown in FIG. 2, generally from 3-10 mixing cells are utilized in the practice of the present process. Upon mixing the phosphate rock, recycle and any makeup feed materials, the mixture constitutes a slurry of about 20-50% solids. At substantially less than 20% solids, more phosphate ion is coprecipitated with calcium sulfate thus causing phosphate loss in the process; while above 50% solids, the slurry is difficult to mix. The slurry has about 62-73% total phosphoric acid and sulfuric acid content in the proportions indicated hereinabove. Below about 43% $P_2O_5$ (58% $H_3PO_4$) and 4% sulfuric acid, free water becomes available for calcium sulfate dihydrate formation and tends to move the operation too far toward Region I of FIG. 1. Above a concentration of about 50% $P_2O_5$ (71.5% $H_3PO_4$) phosphoric acid and 1.5% sulfuric acid, viscosity of the slurry becomes high enough that increased amounts of phosphate ion are co-precipitated with the anhydrite, again causing phosphoric acid losses in the process. Residence time in this zone through the different cells is about 1-4 hours, depending upon temperature, recycle rate of anhydrite seed crystals, volume of the particular cells and the like.

After digesting the rock, as shown in FIG. 2, the slurry passes to a filter to separate the desirable phosphoric acid product from a recycle slurry of anhydrite filter cake and residual phosphoric acid. A portion of the recycle slurry may be converted to calcium sulfate suitable for use in industrial products by filtering, washing, passing the anhydrite to a hydrating section, preferably 1-3 mixing cells, and thereafter, a series separation by conventional means produces a coarse dihydate product suitable for use in gypsum materials, small sized anhydrite relics containing impurities, and clarified filtrate for recycle.

EXAMPLE

Phosphoanhydrite ($CaSO_4$) and strong phosphoric acid were produced by the process of the invention by the acidulation of phosphate rock ore with a phosphoric acid - sulfuric acid mix containing a very high recycle content of anhydrite seed crystals.

The reaction mixture fed to the digesters comprised 44% $P_2O_5$ phosphoric acid (60.7% $H_3PO_4$) and 1.5% $H_2SO_4$. At these acid concentrations, essentially all water is tied up through hydrogen bonding to the acids so that little or no water is available to form calcium sulfate hydrates. The acid mixture contained 5% anhydrite solids as seed crystals. The temperature of the reaction mixture was 85° C., which put the reaction conditions well into Region II in FIG. 1 where anhydrite is stable.

Figure 3:
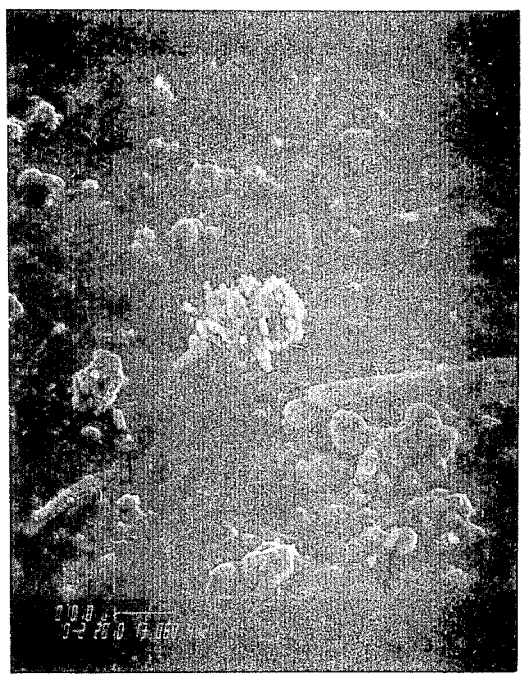
Figure 4:
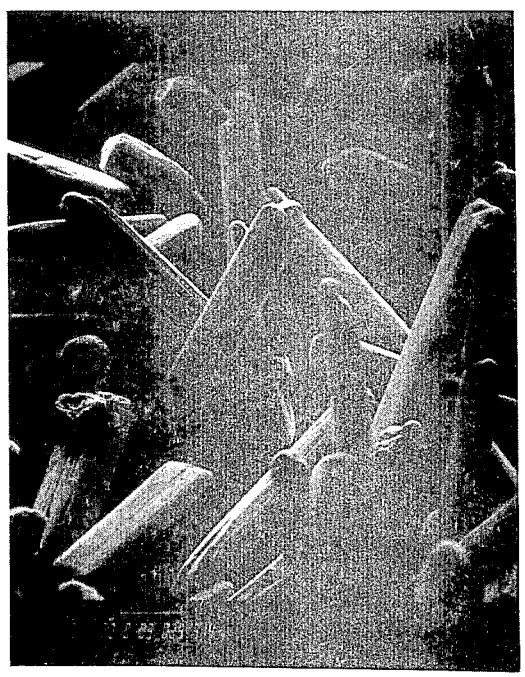

The ground phosphate rock and 60% sulfuric acid were metered in slowly enough so that acidulation could take place readily, and a ratio of at least 20 to 1 by weight of anhydrite seed crystals to phosphate rock was present. Two hours residence time was allowed after the last phosphate addition for complete crystallization of anhydrite. The mixture was filtered while hot and washed with hot water. After drying, it analyzed 38.05% CaO, 52.24% $SO_3$, 0.04% $Fe_2O_3$, 0.09% $Al_2O_3$, 0.08% F, 0.58% P, 0.52% $H_2O$. 0.027 Mg and 5.75% $SiO_2$. X-ray diffraction analysis showed only insoluble anhydrite and alpha quartz. Scanning electron microphotographs of the phosphoanhydrite are illustrated in FIGS. 3 and 4. The process yielded a strong phosphoric acid having a 44% $PO_5$ concentration.

The co-produced phosphoanhydrite may be disposed of or alternatively, converted into useful gypsum products. It may be suitable as is, for example as an ingredient in construction materials such as a Keene's cement. However, if the original phosphate rock contained considerable radioactive matter it may not be suitable. In that case it is preferred to remove such contamination by various means. The phosphoanhydrite obtained in this process is formed into a slurry with about 1-20% accelerator or accelerator mixture (such as 1.5 weight % sulfuric acid and 1.5 weight % sodium sulfate) and substantial proportions of coarse purified gypsum recycle seed crystals (such as about 40 micrometers sized gypsum in 40:1 to 100:1 weight proportions of seed gypsum to anhydrite). The slurry is allowed to hydrate about 30% to 95% of the anhydrite, FIG. 3 (leaving about 70-5% anhydrite relic unrehydrated) depending upon the level of radioactivity in the anhydrite, yielding gypsum crystals, illustrated in FIG. 4 of about 30-100 micrometers (preferably greater than about 50 micrometers). These are readily separated by conventional equipment to a substantially radium-free gypsum which is suitable for conventional processing in the manufacture of gypsum wallboard, gypsum plasters and other gypsum products.

What is claimed is:

1. A process for producing phosphoric acid and calcium sulfate from phosphate rock which comprises:
   continuously feeding finely divided phosphate rock, sulfuric acid, phosphoric acid, water and anhydrite seed to a mixing zone and mixing them to form a slurry;
   the quantities charged to the mixing zone being such as to provide a slurry comprising about 20-50 weight % total solids, about 62-73 weight % total phosphoric acid and sulfuric acid content with about 1-4 weight % sulfuric acid, and about 10:1-100:1 by weight of anhydrite seed to phosphate rock, and mixing at a temperature between about 60° and 110° C.;
   continuously withdrawing a leach slurry from said mixing zone and passing it to a first filtering separation zone to separate calcium sulfate slurry and phosphoric acid;
   recovering a strong phosphoric acid from the first separation zone; and
   recovering a slurry of calcium sulfate anhydrite in phosphoric acid from the first separation zone and returning it to the mixing zone.

2. The process of claim 1 wherein the slurry withdrawn from the first separation zone is passed to a second filtering separation zone to separate coarse calcium sulfate anhydrite filter cake and a slurry of fine anhydrite seed in phosphoric acid filtrate which is returned to the mixing zone.

3. The process of claim 2 wherein the anhydrite filter cake is passed to a crystallization zone to hydrate in the presence of a large proportion of dihydrate seed crystals, a substantial portion but not all of the anhydrite to coarse phosphogypsum; and separating a portion of the phosphogypsum that is low in radioactivity as purified product gypsum.

4. The process of claim 3 wherein the anhydrite filter cake is continuously passed to a crystallization zone;
   mixing in the crystallization zone at a temperature between ambient and 40° C., the anhydrite with seed gypsum and soluble sulfate hydration accelerator to form a slurry,
   the quantities being charged in the crystallizing zone being such as to provide a slurry comprising by weight about 1-20% accelerator and about 1:10 to 10:1 proportions of coarse gypsum to anhydrite, said coarse gypsum being all at least about 30 microns;
   continuously passing the slurry to a third separation zone to separate fine anhydrite relic and coarse gypsum;
   recovering fine anhydrite relic contaminated with radioactive matter and passing it to disposal;
   recovering about 30-90% by weight proportion of the coarse gypsum as product purified gypsum; and
   recovering about 70-10% by weight proportion of the coarse gypsum and recycling it to the crystallizing zone.

5. The process of claim 1 wherein the mixing zone is maintained at 75°-95° C.

6. The process of claim 1 wherein the anhydrite charged to the mixing zone is about 5-15 micrometers particle size.

7. The process of claim 1 wherein the slurry in the mixing zone has about 1.5-2% excess over stoichiometric sulfuric acid.

8. The process of claim 1 wherein the slurry in the mixing zone has about at least 20:1 weight proportions of anhydrite seed to phosphate rock.

9. The process of claim 8 in which the weight proportions are about 60:1 to 80:1 of anhydrite to phosphate rock.

10. The process of claim 4 in which the coarse gypsum product has a particle size between 40 and 100 micrometers.

11. The process of claim 4 in which about 30–95% of the anhydrite is hydrated to gypsum particles of about 30–100 micrometers; coarse gypsum of greater than about 50 micrometers is recovered as purified gypsum product and the particle size of anhydrite crystal remaining not rehydrated is about 5–25 micrometers.

* * * * *